(12) United States Patent
Hamamoto et al.

(10) Patent No.: US 6,467,653 B1
(45) Date of Patent: Oct. 22, 2002

(54) PUMP CONTAINER USING LAMINATED BOTTLE WITH PEELABLE INNER LAYER

(75) Inventors: Keiji Hamamoto, Toyono-gun (JP); Hirokazu Mihashi, Kameoka (JP)

(73) Assignee: Taisei Kako Co., Ltd., Osaka (JP)

( * ) Notice: Subject to any disclaimer, the term of this patent is extended or adjusted under 35 U.S.C. 154(b) by 0 days.

(21) Appl. No.: 09/856,764

(22) PCT Filed: Oct. 2, 2000

(86) PCT No.: PCT/JP00/06863

§ 371 (c)(1),
(2), (4) Date: May 23, 2001

(87) PCT Pub. No.: WO01/26991

PCT Pub. Date: Apr. 19, 2001

(30) Foreign Application Priority Data

Oct. 8, 1999 (JP) .......................................... 11/288790

(51) Int. Cl.⁷ .............................................. B65D 35/28
(52) U.S. Cl. ..................................... 222/105; 222/481.5
(58) Field of Search ....................... 222/95, 105, 386.5, 222/481.5

(56) References Cited

U.S. PATENT DOCUMENTS

| | | | | |
|---|---|---|---|---|
| 4,432,473 A | * | 2/1984 | MacEwen | 222/386.5 |
| 5,037,002 A | * | 8/1991 | Tschanen | 222/105 |
| 5,301,838 A | * | 4/1994 | Schmidt et al. | 222/95 |
| 5,513,761 A | * | 5/1996 | Kobayashi et al. | 222/105 |
| 5,664,700 A | * | 9/1997 | Battle | 222/105 |
| 5,687,882 A | * | 11/1997 | Mueller | 222/481.5 |

FOREIGN PATENT DOCUMENTS

| | | |
|---|---|---|
| JP | 62182044 | 8/1987 |
| JP | 81464 | 10/1996 |
| JP | 10165222 | 6/1998 |
| JP | 11153510 | 3/1999 |
| WO | 9914569 | 3/1999 |

* cited by examiner

Primary Examiner—Philippe Derakshani
(74) Attorney, Agent, or Firm—Wood, Phillips, Katz, Clark & Mortimer

(57) ABSTRACT

A pumping container including a laminated bottle having a delaminatable layer with an inner layer portion serving as a valve for closing ventilation holes. The laminated bottle has the inner layer delaminated from an outer layer and formed on its inner surface. A ventilation hole formed in the outer layer allows ambient air to flow in between the outer and inner layers. The ventilation hole in the outer layer is temporarily closed with a closing portion of the inner layer from inside such that this closing portion will be deformed inwards due to atmospheric pressure so as to open the ventilation hole in response to a negative pressure appearing between the layers.

16 Claims, 12 Drawing Sheets

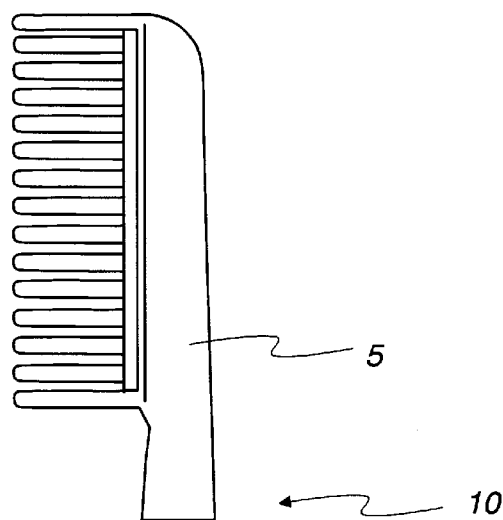
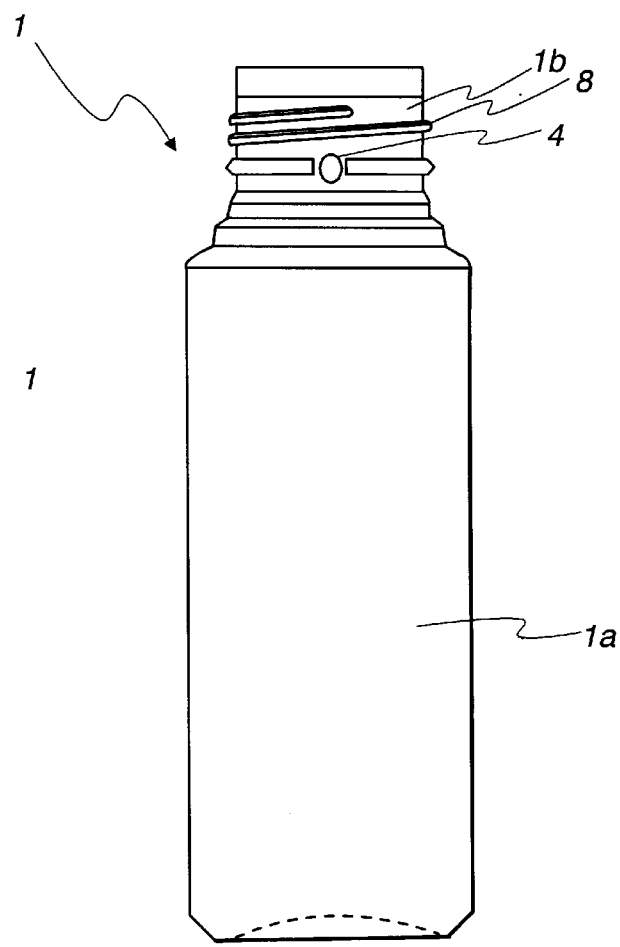

PUMP CONTAINER USING LAMINATED BOTTLE WITH PEELABLE INNER LAYER

FIELD OF THE INVENTION

The present invention relates to a laminated bottle that has a delaminatable inner layer and an outer layer, wherein the outer layer has an inner surface on which the inner layer is laminated and has a ventilation hole to take ambient air in itself. The invention also relates to a pumping container that comprises the laminated bottle and may be a comb-product or the like, the laminated bottle serving as an reservoir charged with a content such as a hair-dyeing agent.

BACKGROUND OF THE INVENTION

Japanese Patent Laying-Open Gazette No. Hei. 4-267727 discloses a multi-layered container, which is designed such that ambient air is inhibited from entering the container through a mouth and its content is discharged by the pumping action of an inner layer and an outer layer. This container consists of a bottle and a cap. The bottle is composed of an impermeable inner layer and a squeezable outer layer. The cap is attached to the mouth of the bottle. The inner layer can be readily delaminated from the outer layer in which ventilation holes are formed such that the ambient air can communicate with the space between the layers. The cap has a check valve incorporated therein. Therefore, the inner layer of this bottle will naturally shrivel with a decrease in its content, with the ambient air flowing into the space through said holes so that only the outer layer can restore and maintain its normal configuration. Owing to this feature, its content remains satisfactory in quality, from the beginning to end of use, without being adversely affected by ambient air or external light beams.

The multi-layered container in the prior art has a film tag adhered in part to the rim of the ventilation hole, and the tag larger than the hole is disposed inside the outer layer. Such a kind of ventilation valve will allow air to flow inwards penetrating only the outer layer from outside. With the container being gripped by a user, the ventilation hole will be closed with the valve due to an increasing inner pressure so as not to allow any amount of air to leak out from the interlayer space. Such a depressed outer layer will raise the interlayer air pressure to thereby depress in a centripetal direction the inner layer so as to exude the content out of the container.

The prior art method comprising the steps of preliminarily blow molding or thermally forming the outer layer and subsequently integrating it with the inner layer does however require so many steps as increasing manufacture cost of the multi-layered pumping containers and lowering yield thereof. In an alternative method, the laminated bottle with the ventilation hole formed solely in the outer layer may be molded, and the ventilation valve is then attached to the hole. However, this method will also increase the number of steps and necessary parts, inevitably resulting in a higher manufacture cost.

DISCLOSURE OF THE INVENTION

The present invention provides a laminated bottle having a delaminating inner layer, and also provides a pumping container comprising the laminated bottle such that at least one ventilation hole is opened or closed by and/or with the inner layer itself to take ambient air in a space between the inner and outer layers, without needing any discrete or additional suction valve. This feature of the invention will be effective not only to decrease the number of necessary parts but also to simplify the structure, thus abridging manufacture process and reducing manufacture cost. Further, the inner layer may have a closing portion capable of elastic recovery to temporarily close the at least one ventilation hole formed in the outer layer, hereby the air between these layers is more reliably prevented from leaking out.

In accordance with the present invention, the laminated bottle may have the delaminating inner layer laminated on the inner surface of the outer layer and capable of exfoliation therefrom, wherein the at least one ventilation hole is formed in the outer layer to allow ambient air to flow into the space between the outer and inner layers. The ventilation hole in the outer layer may be normally closed with a closing portion of the inner layer from inside. The closing portion may function as a valve that is capable of inward deforming due to atmospheric pressure in response to a negative pressure appearing in the space between the inner and outer layers. Because the closing portion provided as an integral part of the inner layer functions as a valve in the laminated bottle of the invention, any discrete or extra valve body need not be mounted, therein. Despite lacking in any discrete valve body, a user does not have to shut the ventilation hole with his or her fingers when he or she will squeezes the bottle. As content in the bottle gradually flows or exudes out, the closing portion will be pressed outwards by the content, hereby it will be spontaneously close the ventilation hole.

Preferably, the closing portion of the inner layer may have elasticity for shape recovering so as to close the ventilation hole. Such a closing portion will restore its natural configuration to close again the outer layer ventilation hole, upon disappearance of negative pressure within the interlayer space due to inflow of a sufficient amount of ambient air into said space. Thus, the bottle's outer layer may be squeezed subsequently or later, surely inhibiting the air from flowing out of the interlayer space.

The laminated bottle of the invention may comprise of a body and a mouth, by forming the outer and inner layers to comprise respective body parts and respective mouth parts. Preferably, the at least one ventilation hole is formed in the outer layer's mouth part, and the inner layer is made thicker at its mouth part than its body part so as to act as the portion for closing said hole. This structure will enable a cap fitted on the bottle to hide the ventilation hole, affording a pleasant appearance to the product, viz., container. In contrast with such the mouth part of inner layer made thicker to be capable of restoring its normal shape to close said hole, the thinner and film-shaped body part of inner layer will readily deflate in the course of discharging the content. A parison to be blow molded for forming the bottle may be of a uniform thickness from its mouth part to body part, and by stretching only the body part of the parison in the blow molding step, it is possible to provide the bottle that the body part of the inner layer is of a film-like shape and the mouth part of the inner layer is of a layer thickness such as the same has elasticity for shape recovery. This means that any extra step or additional process is not needed herein to give the inner layer portion a shape capable of performing itself as a kind of valve body.

The mouths of outer and inner layers may be of a cylindrical shape (whether round or elliptic), the ventilation hole may be formed in the mouth part of the outer layer, and the mouth part of the inner layer may act as the closing portion as described above. If the inner layer's mouth part as closing portion is cylindrical, its elastic recovery will be enhanced to surely seal the ventilation hole.

In the described bottle of this invention, a bottom of the inner layer may comprise a flange fixed on and/or engaging with a bottom of the outer layer, securing these bottoms to each other to prevent the inner layer's lower end portion from curling up. Preferably, the flange may be formed when molding a inner preform for forming the inner layer by injecting a molten resin to an interior of an outer preform for forming the outer layer through a through-hole that is previously formed in a bottom of the outer preform.

The laminated bottle having the mouth in the invention may be utilized to construct any pumping containers for varied uses, if a cap comprising a check valve is attached to the mouth. Such the pumping container provided herein may substantially comprise of the laminated bottle and the cap fixed on the mouth, wherein the body part of the bottle's outer layer is capable of being deformed so as to deflate. Also, the cap may have an outlet orifice for discharging the content stored within the inner layer out of the inner layer, and a check valve may be attached to the outlet orifice. The outer layer may be shaped in any proper fashion such as a cylinder squeezable in radial direction or as a tubby structure to be compressible in axial direction.

The laminated bottle may be formed by an appropriate method such as injection molding and/or blow molding. Examples of the blow molding are the direct blow molding method and the injection-stretching-blow molding method. Preferably, the latter method may be employed to produce precise molded products.

Also, the present laminated bottle may be manufactured by a method that comprises of the step of injection molding an outer layer preform, the step of injection molding an inner layer preform inside the outer layer preform, and the step of blow molding a parison composed of these preforms. Further, the ventilation hole may be formed at the step of injection molding the outer layer preform, and at least one pin will be inserted into the hole when molding the inner preform.

In this method of making the laminated bottles, the ventilation hole is formed at the step of injection molding the outer layer preform, lest the inner layer should not be injured. Also, it is no longer necessary to manually punch the holes in the outer layers one by one after injection molding same, thus improving manufacture efficiency.

Those outer and inner layers may have respective molded configurations each composed of a body portion and a mouth portion to constitute a bottle. To protect the mouth portions of the outer and inner layers from separation from each other, a relatively large thickness of the inner layer may for instance be effective. The outer layer will be rendered so easy to squeeze as enabling it to readily deform itself elastically if depressed with a user's hand, or alternatively may be rigid in the event that a pump for sucking the content of bottle would be attached to the mouth portion.

In the method of making the bottles, the parison may preferably be blow molded in such a way that the stretching of the parison is effected below its region where the ventilation holes are located. The ventilation holes in this case are protected well from deformation which the step of stretching would cause, thereby preventing the resin fractions around the holes from flowing therein to clog same. Stretching does not take place around the ventilation holes, so that a portion of the inner layer surrounding the hole will have its wall thickness as thick as the same of the inner preform. Thus, the body part of the inner layer for containing the liquid content (i.e., the charged content) can be thinner than the mouth part of the inner layer to be of a film-like shape and/or structure. At the same time, a portion of the inner layer, which is located adjacent to the ventilation hole, may be thicker than the body part of the inner layer so as to be capable of elastic recovery. The inner layer constructed to naturally close the ventilation holes will however be depressed readily apart from them by external air pressure. It will deform itself inwardly so as to open those holes when ambient air is allowed to enter the interlayer space through them. The ventilation holes behave as if they were valves, so that it is no longer necessary to incorporate any extra or additional valve that would increase the number of constituent parts and raise manufacture cost.

In this method of making the laminated bottles described above, various appropriate manners may be employed to make the ventilation holes solely in the outer layer. For example, the outer layer preform may be injection molded using a cavity segment and a core segment, and then be left to remain in the cavity segment. The inner layer preform will subsequently be injection molded using the cavity segment in combination with another core segment substituting for the first-mentioned core segment. In this mode of the method, the ventilation holes may be formed by causing pins to contact the first core segment before the resin becomes hard at the step of injection molding the outer layer preform. The ventilation holes are allowed to remain closed with the pins while the inner layer preform is being injection molded.

Such a method described above may be conducted using the following apparatus. Namely, this apparatus will be used to produce a parison to be blow molded into a laminated bottle. The parison is composed of an outer and inner layer preforms and has ventilation holes only in the outer layer at desired portions thereof. A mold constituting this apparatus may comprise a cavity segment and two discrete core segments, wherein one of the core segments is selected and fastened to the cavity segment so as to mold the outer layer preform at first, and subsequently the other core segment will be used to mold the inner layer preform. Further, this apparatus may comprise pins in connection with the cavity segment in order to form the ventilation holes. Those pins can shift themselves between their projected position contacting the first-mentioned core segment and their retracted position embedded in the cavity segment.

Although the pins in the described example to form ventilation holes are located in connection with the cavity segment, they may alternatively be disposed in a lip segment if the apparatus has same. In this case, the pins at their retracted position will be enclosed with said lip segment.

Further in an alternative method of forming ventilation holes only in the outer layer preform, this preform will be molded in an injection mold and then removed therefrom. This outer layer preform is then inserted in a further and separate injection mold for forming the inner layer preform so that pins equipped in connection with the further mold are inserted from outside into rough ventilation holes that have been formed. Inner ends of those pins will be brought into flush with the inner surface of the outer layer preform, before the inner layer preform is injection molded.

Such an alternative method described above may be conducted using the following apparatus to produce a parison to be blow molded into a laminated bottle. This parison will also be composed of an outer and inner layer preforms and have ventilation holes only in the outer layer at desired portions thereof. This apparatus may comprise an injection mold for forming the outer layer preform and a further injection mold for forming the inner layer preform. Pins for forming the ventilation holes are provided in the first-mentioned mold so as to shift themselves between their projected and retracted positions. The secondly-mentioned mold comprises pin-shaped stoppers that are to be inserted from outside into the ventilation holes previously formed in the outer layer preform.

The method described above addresses parisons that are to be blow molded to give the delaminating types of laminated containers. However the present invention is not restricted thereto but is applicable to a variety of injection molded laminated articles (such as laminated parisons) each composed of two or more resin layers. In other words, the present invention proposes a method of making ventilation holes solely in an outer layer of an injection molded laminated product having an inner layer inside the outer layer. The method may comprise the steps of injection molding the outer layer and then molding the inner layer so that the ventilation holes are formed during the step of injection molding the outer layer, wherein the inner layer is injected while pins remain inserted in the ventilation holes.

The parison-forming mold employed in the apparatus and method of the present invention may comprise at least one cavity segment and at least two core segments, larger and smaller. This mold may further comprise a projectable member that is mounted in the cavity segment so as to contact the side surface of the larger core segment. An appropriate means may also be incorporated to drives pins preferably serving as the projectable members.

When molding the outer layer preform in the described mold, this preform's portions where the projectable members are temporarily located can not be filled with a resin for forming this preform. As a result, those portions will define the ventilation holes penetrating that preform from an outer surface to inner surface thereof This means that the ventilation holes as air passages can be formed already at the same time as the outer layer preform is molded.

The projectable member incorporated in the mold described above may be held in and by the lip segment so as to be capable of contacting the core segment's side face. Alternatively, that member may be held in and by the core segment so as to contact the inner surface of the cavity segment or the lip segment. In any case, the projectable member may preferably be located below a threaded portion surrounding a mouth of the container that will be produced from the preform.

Also, this method of making the laminated bottles comprises the step of forming one or more ventilation holes that penetrate the outer layer preform from an outer surface to inner surface thereof, at the same time as this preform is molded. The ventilation holes are thus formed already at the step of forming the outer layer preform. The present method now eliminates the problem inherent in the prior art that has been injuring the inner layer when forming the ventilation holes in the outer layer during the blow molding step. Further, works for manually piercing such holes one by one in the injection molded outer layer are no longer necessary, thus enhancing manufacture efficiency.

The delaminating inner layer preform is formed herein onto the inner surface of the outer layer preform in such an advantageous manner that their portions located below the ventilation holes are subsequently stretched for orientation.

According to this method, inner layer portions corresponding to the ventilation holes maintain an original wall thickness, so that each of such relatively thickened portions may function as a kind of valve body cooperating with the ventilation hole. Thus, manufacture process becomes simpler and less expensive, as compared with the case of employing extra and discrete valves.

Also in the present method, an inner end of the projectable member may be located substantially in flush with the inner surface of the outer layer preform when the inner layer preform is molded using the mold described above.

Due to this feature, a resin forming the inner layer preform can be prevented from flowing into portions that have to form the ventilation holes in the outer layer preform.

In the manufacturing methods described above, the ventilation holes may preferably be formed below a threaded portion of the outer layer preform.

The laminated bottle with the flange disposed in the inner layer's bottom may be produced by the following manufacturing method. In the method providing laminated bottles whose peripheral walls are composed each of an outer layer and an inner layer disposed therein, a resin of the inner layer has a lower melting point than that of the outer layer. In detail, the outer layer preform will preliminarily be injection molded, and subsequently the inner layer preform is injection molded on the inner surface of the outer layer preform by using another resin whose melting point is lower than that of the outer layer resin. The parison composed of the outer and inner layer preforms will finally be blow molded. The through-hole mentioned above may be formed in the outer layer preform when this preform is injection molded, by such an arrangement that a gate penetrating the cavity segment for injection of the second resin does face the through-hole. In this case, a molten resin will be guided through this gate and the through-hole into the interior of the outer layer that has been placed in the mold for injection molding the inner layer. In this invention, the inner layer preform is, molded after the outer layer preform has been molded, as repeatedly discussed above. Therefore, even if the inner layer preform is made of a polyolefin or the like material and the outer layer preform is made of a 'PET', an 'EVOH' or the like resin, these two kinds of resins will not intermix with each other but be demarcated from each other. Consequently, the laminated bottle made by this method has the inner layer ready to exfoliation from the outer layer during use, thus protecting a liquid content in this bottle from change in its chemical properties. Further, the through-hole in the outer layer preform may be produced by putting a pin towards the gate so as to bring a free end of the pin into contact with the gate, after injection of the resin though the gate. The gate in this case will be sealed up with the pin lest any gate flashes should be produced, thus making it unnecessary to sever them from container bodies.

The flange mentioned hereinbefore is produced of the same resin as the inner layer preform so as to be disposed outside the through-hole during the injection molding of the inner layer preform. The flange is integral with a resin mass disposed in the through-hole and is therefore integral with the inner layer preform itself. Such a flange is considerably larger than the through-hole in diameter so that the inner layer can be securely fixed in part in the outer layer. Due to this feature, a stretching rod used at the step of stretching-blow-molding will be prevented from peeling the inner layer off the outer layer. If such a flange is located at the bottom of the bottle, the inner layer will be allowed to delaminate from the outer layer during use, without giving rise to the problem of curling up of the inner layer's lower end portion. Tie 'flange' may either be formed in flush with the outer surface of the outer layer, or alternatively, jutting outwards from the through-hole.

In case of using the method to manufacture laminated bottles each having a delaminating inner layer, a resin of the inner layer preform may preferably be projected out of the through-hole of the outer layer preform so as to form a stud-shape protrusion, before injection molding the inner layer preform. A stretching rod used to carry out the step of longitudinally stretching the parison will collapse the protrusion stud-shaped and made of the resin forming the inner layer. The longitudinal stretching conducted at the step of blow molding will press the bottom of the parison to collapse the protrusion to reform it as a flange disposed outside the bottom of outer layer. The inner and outer layers are thus fixedly secured to each other at their bottoms. In this way, any additional step is not needed to integrate these layers with each other at their bottoms.

In addition, the injection molding of the inner layer preform may be conducted such that a plurality of thickened portions are formed integral with the preform in such a fashion that each portion extends longitudinally and at angular intervals. Thus, the blow molded laminated bottles will have each the inner layer that is formed integral with pillar or rib-shaped thickened portions. Those thickened portions will provide a moderate resistance to deformation such that the inner layer is inhibited from any abrupt and irregular delamination from the outer layer. Flat regions each interposed between the linear thickened portions of the inner layer will be caused to make a gradual and inward displacement, to thereby ensure uniform shrivelage and deformation of the inner layer over full height thereof in each bottle. Neither a middle portion of the inner layer nor an upper end portion thereof (located close to the bottle mouth) will shrivel sooner than the lower portion of the layer. Thus, the latter portion is protected from being sealed not to exhaust a liquid content. Since the inner layer preform is injection molded herein, the forming of such thickened portions can easily be done during the injection molding step in a reliable manner to give products each having a uniform internal texture.

Alternatively, it is possible to provide the inner layer preform with a barrel-shaped part that has a thickened region extending in a helical direction. This region may be a helical protrusion formed integral with the inner surface of the barrel-shaped part. Alternatively, a helical recess may be formed in and along the inner surface of the outer layer preform, and then the inner layer is injection molded inside the outer layer preform to produce such a helically thickened region.

Also, the injection mold used herein to produce the outer layer preform with a closed bottom may comprise the cavity segment in combination with a modified core segment having the pin. This pin is intended to contact an inner surface of the closed bottom of the cavity segment. Such a type of the mold may also be suited to preparation of the outer layer preform in the present invention. If this mold is employed to form an outer layer, then a space occupied by the pin can not be filled with any amount of the resin of this preform. Thus a through-hole will be produced to extend from an outer surface to inner surface of the outer layer preform. In short, the hole is formed through the bottom of this preform while molding same.

Alternatively, the injection mold just described above to produce the outer layer preform having the closed bottom for constituting the laminated container may comprise the at least one core segment and the at least one cavity segment, with the latter segment having a pin to contact the closed end of the former segment.

Each of these injection molds may have the pin capable of projecting into and being retracted from a gate so that this gate facing the pin is clogged therewith.

In summary, the laminated bottle of the invention described above may be produced utilizing the following manufacturing apparatus. This apparatus is composed of a device for injection molding the outer layer, a further device for injection molding the inner layer, and a still further device for blow molding them. A cylindrical outer layer pre-form having a bottom and a through-hole formed through the bottom will be injection molded by the first-mentioned device. The further device for injection molding the inner layer injects an inner layer preform inside the outer layer preform. The still further device blow molds a parison that is formed with a bottom and composed of the outer and inner layer preforms, while biaxially stretching the parison longitudinally and transversely in such a way that the inner layer delaminatable from the outer layer is laminated on the inner surface thereof to provide a laminated container. The device for injection molding the inner layer preform may have a gate for passing a molten resin through the hole to thereby inject it from outside into the outer layer preform. The gate may be spaced outwards from the through-hole. Using these devices, the gate formed in a mold for injecting the inner layer is spaced a distance from the through-hole of the outer layer preform. A portion of the resin for the inner layer preform protrudes out of the hole and solidifies to be left there, when injection molding the inner layer preform with the further device. At the step of longitudinally and circumferentially blow molding the parison using the still further device, a stretching rod will collapse this protrusion when the parison with bottom is longitudinally stretched. Subsequently, the resin will spread on the outer surface of the outer layer bottom to engage the inner layer with the outer one at the bottom of the container. It is possible to form the inner layer using such a resin as having a lower melting point than that of the outer layer. In other word, it is now possible to choose the most preferable resin because the molten resin of the inner layer preform is introduced through the hole already formed in the bottom of the outer layer preform, so as to flow on and along the inner surface thereof.

BRIEF DESCRIPTION OF THE DRAWINGS

FIG. 2 also is a side elevation of a comb-shaped product constructed using a laminated bottle provided in the embodiment, FIG. 3 is a side elevation of the laminated bottle included in the comb-shaped product shown in FIG. 2, from which a cap of the comb-like shape is removed;

THE BEST MODE OF CARRYING OUT THE INVENTION

Figure 1:
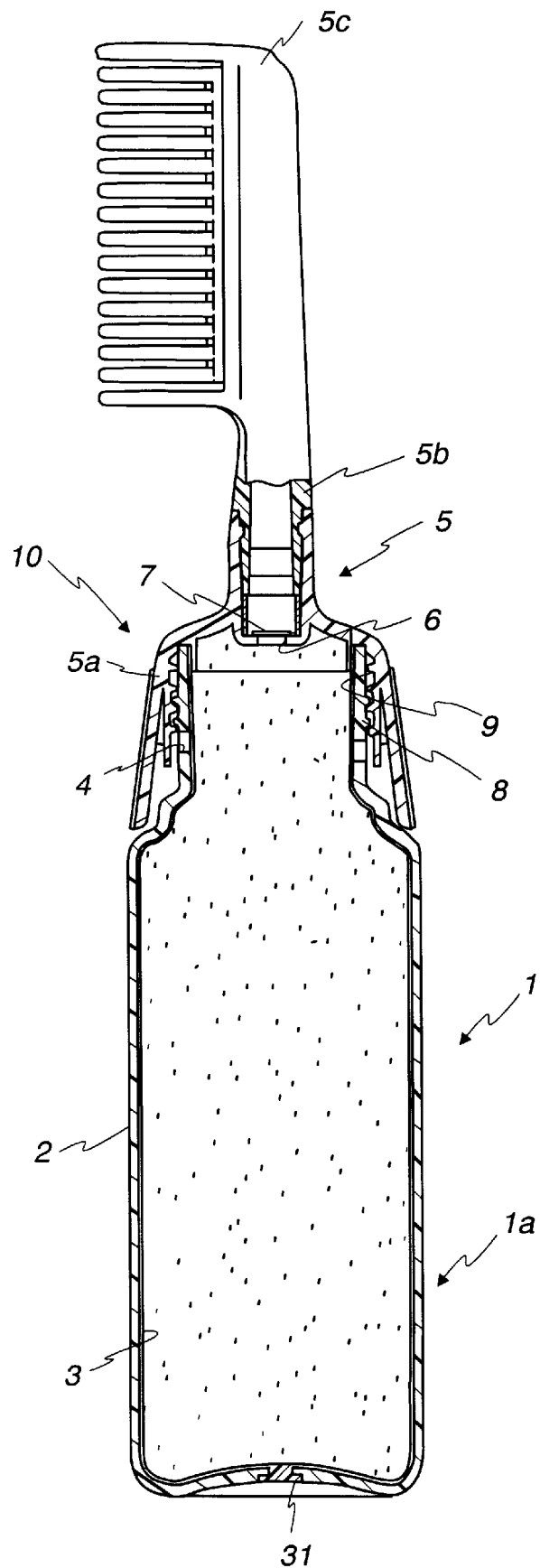
FIG. 1 is a vertical cross section of a pumping container provided in an embodiment of the present invention.

Now some preferred embodiments of the present invention will be described referring to the accompanying drawings, in order to make it more apparent.

FIGS. 1 to 5 show a comb-shaped product 10 that is a pumping container including a laminated bottle (sometimes called 'multi-layer bottle' or 'delamination bottle') 1 with a delaminating inner layer. The comb shaped product 10, viz., the pumping container, is suited for uniform application of its content such as a hair-dye to human hair. When a user grips and presses a body part 1a of the bottle 1, it will deflate and deform so as to exude its liquid content through a passage extending through a comb shaped cap 5. This content will thus flow out of a plurality of holes formed in an end portion of the comb. If the user stops gripping and pressing the bottle 1, it recovers its normal configuration. Such a character of the bottle 1 is. called "squeezability". The comb shaped product 10 comprises the comb-shaped cap 5 fitted on a mouth 1b of the bottle 1. This comb shaped cap 5 is composed of a cap portion 5a fitting on the mouth 1b, a stem 5b protruding from the top of cap portion 5a and a teeth portion 5c continuing from the stem 5b. This stem 5b is made hollow to communicate with the interior of the bottle through a discharging mouth 6 formed in the cap portion 5a. The discharging hole 6 has a check valve 7, which on one occasion during use allows the liquid content to flow out of the bottle into the comb shaped cap 5, but on the other occasion prevents the content from flowing back into the bottle.

Figure 4:
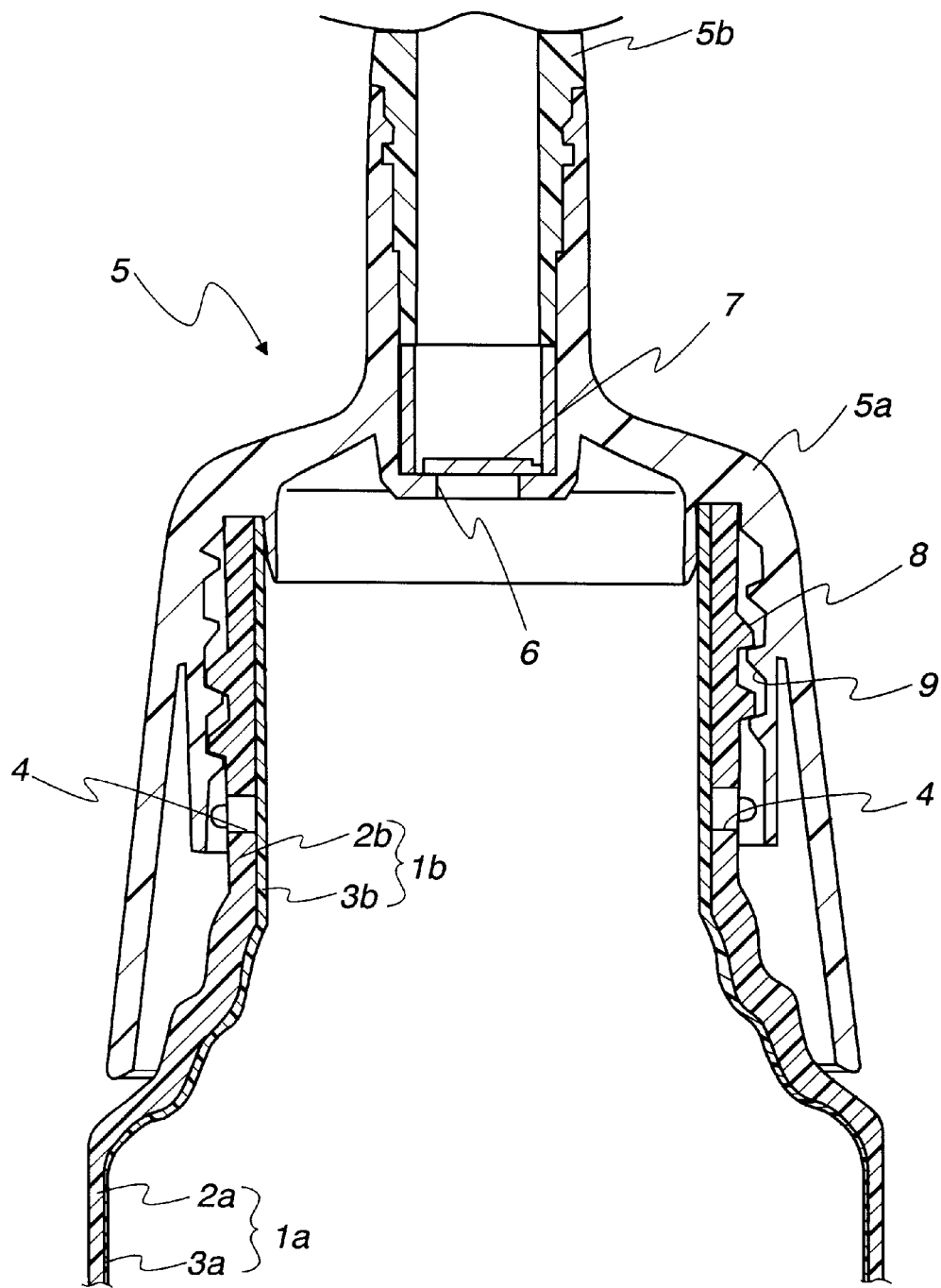
FIG. 4 is an enlarged cross section of a principal portion that is included in the pumping container shown in FIG. 1.
Figure 5:
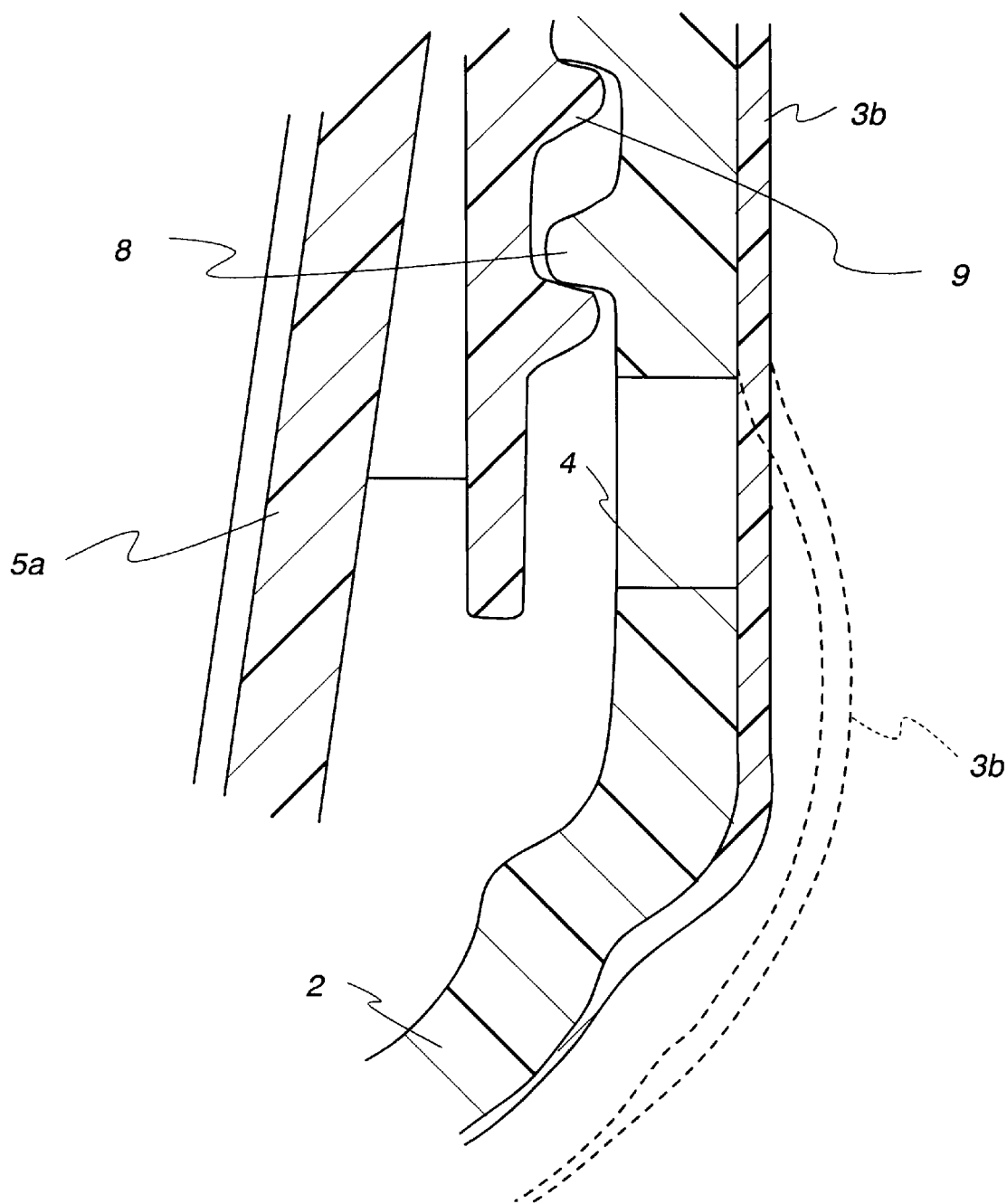
FIG. 5 is a further enlarged cross section of the principal portion shown in FIG. 4.

As shown in FIGS. 3 and 4, the bottle 1 has a male-threaded portion 8 formed integral with its outer periphery around the mouth 1b. This threaded portion 8 is to be fastened into a mating female-threaded portion 9 that is formed in the inner periphery of the comb shaped cap 5a, to thereby fix the latter on the bottle 1. Round ventilation holes 4 are formed in the mouth, below the threaded portion 8 and diametrically at opposite positions. Those ventilation holes will allow ambient air to flow into a space between an inner layer and an outer layer of the laminated bottle 1.

As seen in FIGS. 1 and 4, the laminated bottle 1 is composed of the outer layer 2 and the inner layer 3 formed therein. Those inner and outer layers 2 and 3 comprise cylindrical body parts 2a and 3a and cylindrical mouth parts 2b and 3b, respectively. In other words, the bottle's body 1a consists of these body parts 2a and 3a, with the mouth 1b of bottle similarly consisting of these mouth parts 2b and 3b. The outer layer 2 may be made of a PET (viz., polyethylene terephthalate), an EVOH (viz., a copolymer of ethylene and vinyl alcohol) or the like. The inner layer 3 is a film prone to exfoliate from the outer layer 2 and capable of deformation relative thereto. A material for forming the inner layer 3 may be a polyolefin resin (such as a polyethylene) of an excellent gas-barrier property. The ventilation holes 4, that are not formed in the inner layer 3, does however penetrate the outer layer 2 from its outer surface to inner surface. Those holes are designed and arranged not to be closed with the comb shaped cap 5. The valve body 7 formed integral with the cap 5 faces the mouth 1b of the laminated bottle 1. This valve body 7 will readily open when the content within the inner layer 3 flows outwards into the cap 5, but will prevent any amount of the content from returning therefrom to the interior of inner layer 3.

The ventilation holes 4 in the mouth part 2b of the outer layer 2 will be closed temporarily with the inner layer's mouth part 3b itself from inside. In this mode, the inner layer's mouth part 3b works as a closing portion for the ventilation holes 4. However, the mouth part 3b will open those holes 4 in response to a negative pressure occasionally appearing in the space between the outer and inner layer body parts 2a and 3a. As a result, atmospheric pressure will deform the said mouth part 3b inwardly to depart from the holes, as indicated by the chain double-dashed lines in FIG. 5.

The inner layer mouth part 3b (i.e., the closing portion) in this embodiment has such a wall thickness and an inner diameter that the mouth can elastically recover its home position to close the ventilation holes 4. For instance, the wall thickness of the inner layer mouth part 3b may for instance be about 0.5 mm, with the mouth diameter (i.e., its inner diameter) being 25 mm. On the other hand, the inner body part 3a may be made so thin to have a wall thickness of about 0.2 mm in order to readily deflate and deform itself as the liquid content is discharged. In order for the outer layer body part 2a to be smoothly depressed, it is made relatively thick to be of a wall thickness of about 0.6 mm and has an outer diameter of about 45 mm. As for the outer layer mouth part 2b, it is formed to have a thickness of about 3–4 mm so as to be rigid enough to hold the cap 5 thereon.

A flange 31 formed in a central bottom portion of the inner layer 3 firmly engages with a corresponding central bottom portion of the outer layer 2. This flange 31 made of the same resin as the inner layer 3 is therefore an integral portion thereof.

Figure 6:
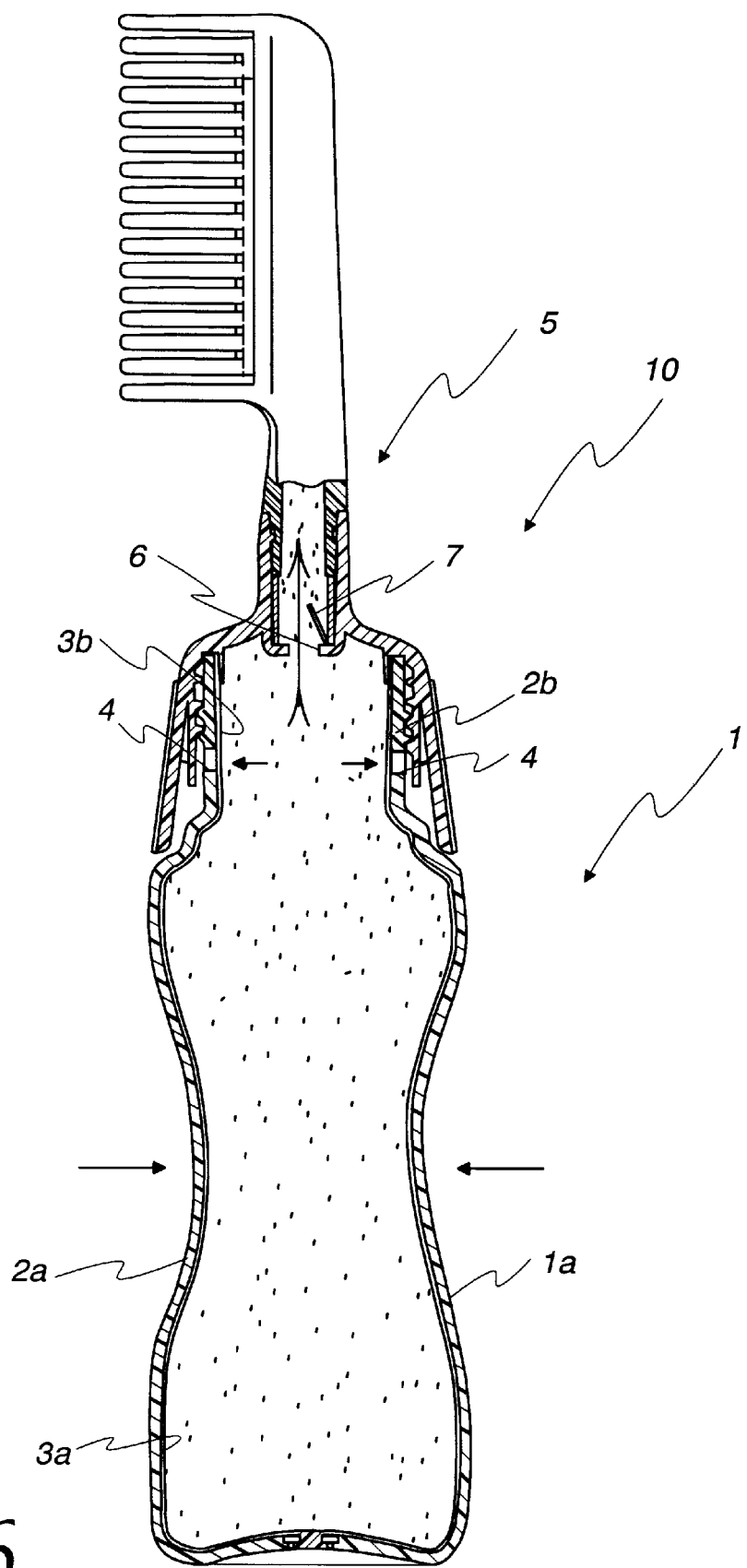
FIG. 6 also is a cross section of the pumping container including the laminated bottle, wherein the container is shown in its entirety and the bottle has its body being gripped.
Figure 7:
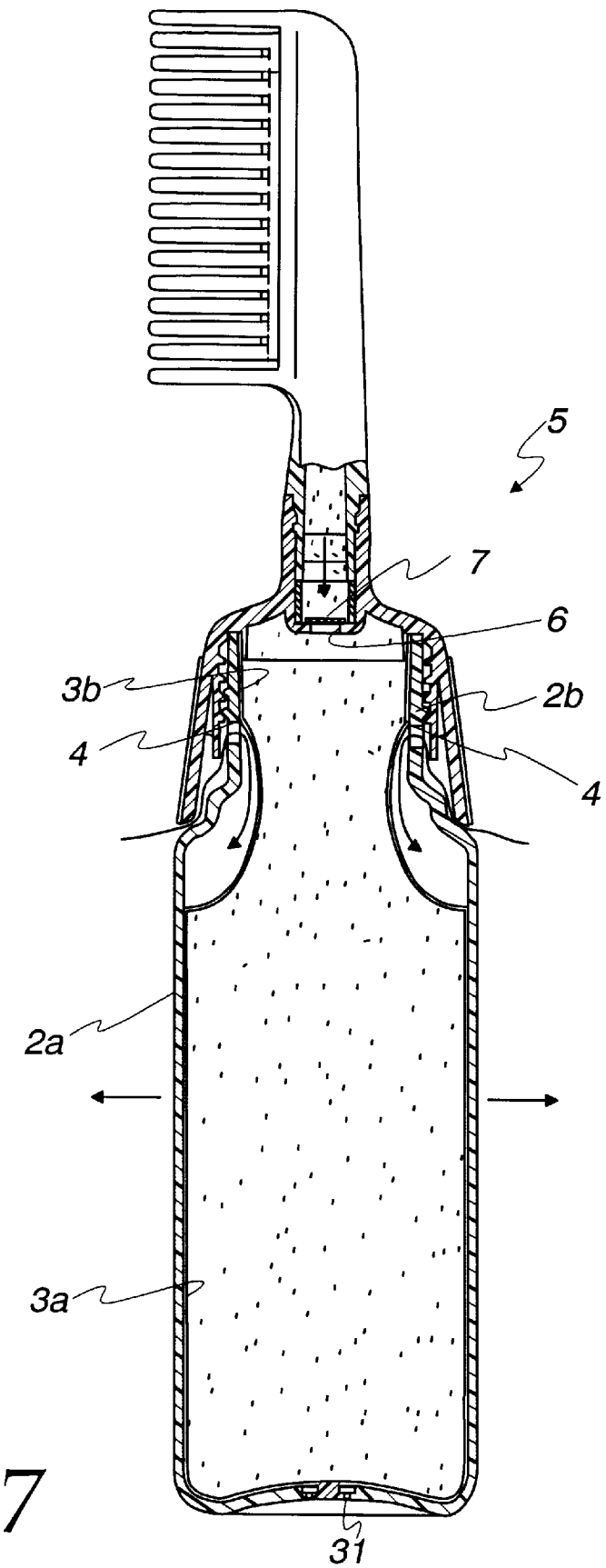
FIG. 7 is another cross section of the pumping container including the laminated bottle, wherein the container is shown in its entirety and the bottle is in its non-gripped state.

In use of the pumping container 10 described above, a user will grip and depress the body part 1a of the laminated bottle 1, in a manner shown in FIG. 6. Consequently, the outer and inner body parts 2a and 3a will deform themselves inwardly in a radial direction. Thus, the liquid content held in the inner layer 3 will open the check valve 7 to flow out through the discharging mouth 6 into the comb-shaped cap 5. If the user stops gripping and depressing the laminated bottle 1 as seen in FIG. 7, the outer layer 2 will recover its normal configuration. The inner layer 3 will however remain depressed, because the check valve 7 is kept closed to prevent the liquid content from returning to the interior of inner layer 3, also inhibiting ambient air from entering it. As the outer layer 2 tends to restore its natural configuration, a negative pressure will appear in the space between the outer and inner layer body parts 2a and 3a. As a result, atmospheric pressure will force the inner layer mouth part 3b inwards to depart from the ventilation holes 4 of outer layer 2, consequently allowing ambient air to dash in between the inner and outer layers 3 and 2 through said holes. Upon full return of the outer layer body part 2a and sufficient introduction of ambient air through those holes 4, such a temporary deformation of the inner layer mouth part 3b will disappear to allow it to take again its normal and cylindrical shape to shut the holes 4.

If and when the user grips and depresses again the laminated bottle 1 later or subsequently, the inner layer mouth part 3b having closed the ventilation holes 4 will inhibit the air present between the outer and inner layer body parts 2a and 3a from leaking out of the bottle. Such an 'interlayer' air will thus be compressed by a temporarily decreased capacity of the outer layer body 2a being deformed, so as to depress the inner layer body part 3a from outside to force the liquid content of the inner layer 3 outwardly towards the comb-shaped cap 5.

Figure 8:
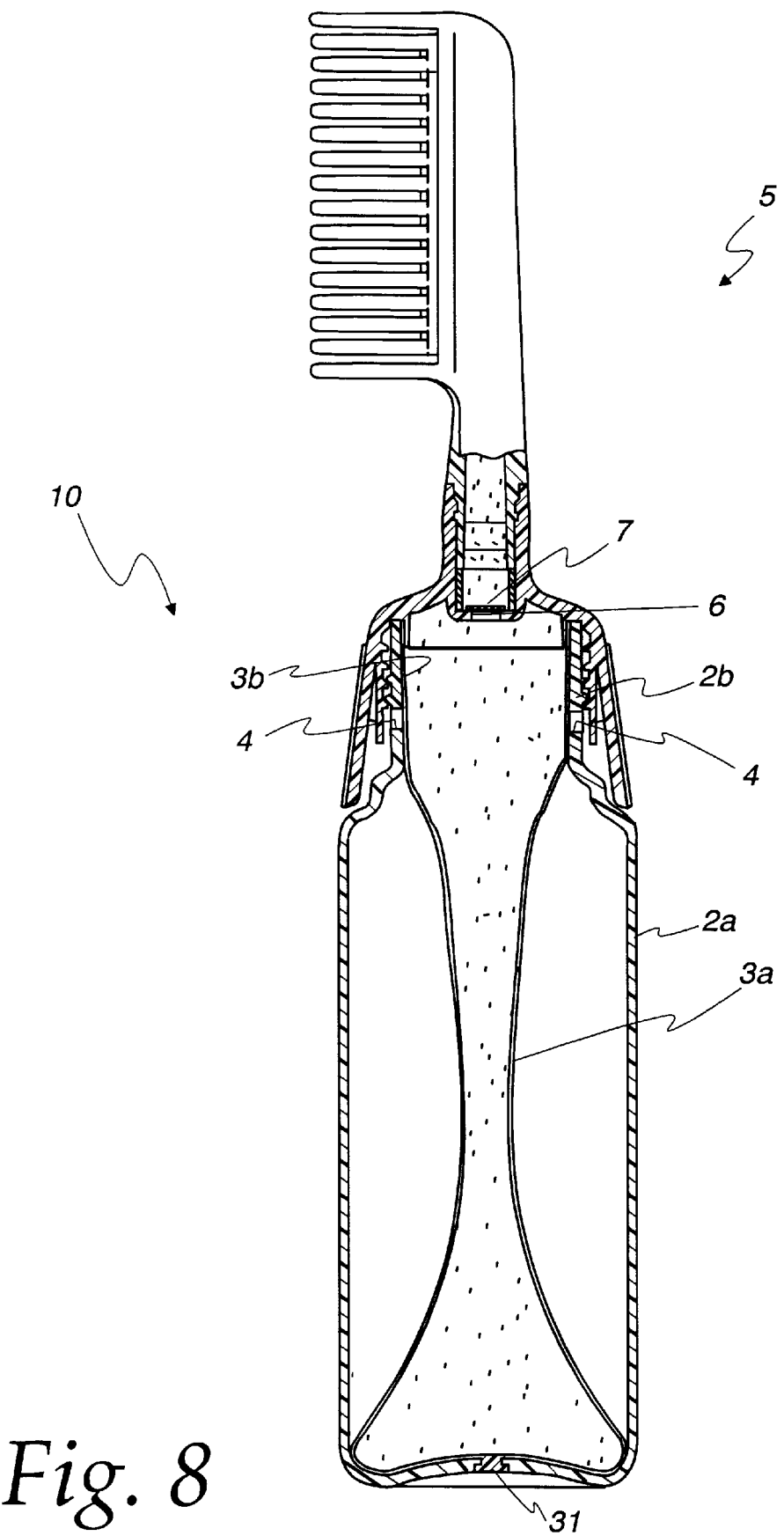
FIG. 8 is an overall cross section of the pumping container whose content has largely been dispensed.

Even if the liquid content is further discharged out of the container, its inner and outer layers 3 and 2 will remain firmly fixed to each other at their bottoms as shown in FIG. 8. Owing to this feature, the bottom end portion of the inner layer 3 is prevented from curling upwards, while allowing the liquid content to be completely exhausted and enabling visual inspection of the interior of container to know from time to time how much content is left therein.

Figure 9:
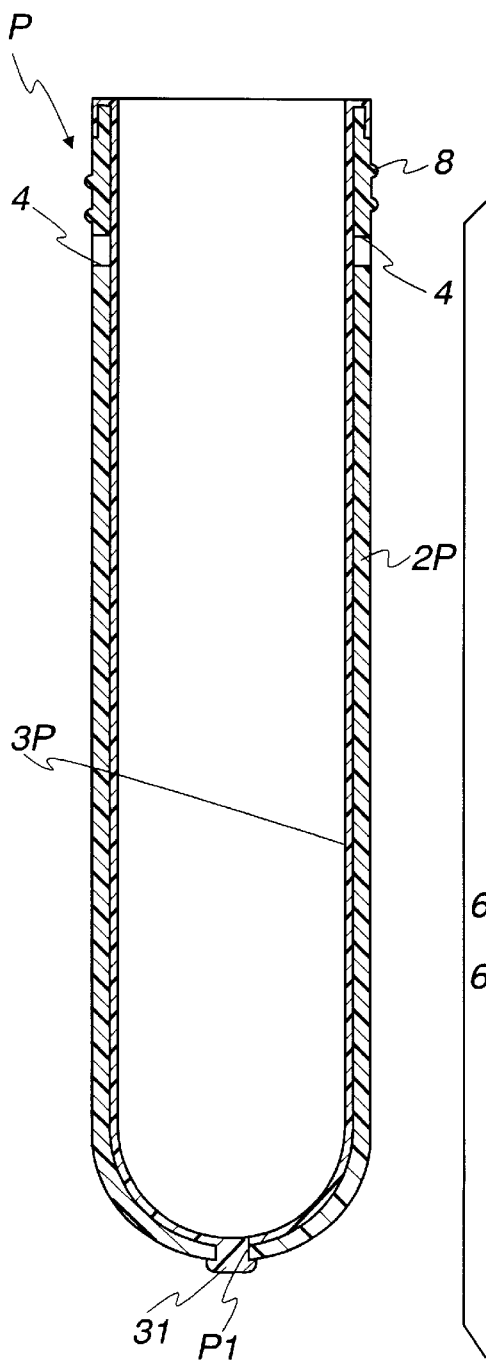
FIG. 9 is an overall vertical cross section of a preform to be blow molded to give the laminated bottle.

The laminated bottle 1 discussed above may preferably be produced by the injection-stretch-blow molding method. Desirably, a parison 'P' of such a structure as shown in FIG. 9 may be blow molded to give that bottle. This parison 'P' is prepared by injection molding at first a cylindrical outer layer preform '2P' and subsequently a cylindrical inner layer preform '3P' therein, each preform having its closed bottom. The ventilation holes 4 are preferably formed when injection molding the outer layer preform 2P. It is also preferable herein to form the flange 31 when molding the inner layer preform 3P, by using a mold whose female segment (viz., a cavity segment) has a recess around its gate for injecting a resin to form said inner layer preform. The inner layer preform 3P may be prepared by injecting a molten resin inside the outer layer preform 2P through a through-hole 'P1' that has previously been formed to penetrate a central portion of the outer preform's bottom.

Next, FIGS. 10 to 16 will be referred to in describing a mold designed to preliminarily form a parison, as well as a method of and an apparatus for making the laminated bottles using the parison. A rotary plate 50 is supported on a frame not shown and intermittently driven in one direction. This plate 50 from which a lip segment 51 (namely, a threaded segment) depends will cause it to circulatingly move between an injection station, a blowing station, and a discharging station, sequentially in this order. The lip segment 51 consists of a pair of split halves that are engageable with and disengageable from each other in a transverse direction, so as to be closed or opened by means of a driving mechanism not shown. In its closed position, that segment will hold therein from time to time either the mouth part of the un-stretched parison or that of the stretched parison, viz., a laminated bottle. Such a lip segment 51 is operatively connected to the bottom surface of the rotary plate 50.

At the injection station, the outer and inner layer preforms 2P and 3P are molded. In this embodiment, the injection station is divided into a first substation (viz., an apparatus or device for injection molding the outer layer 2P) and a second substation (viz., a further apparatus for molding the inner layer preform 3P). In detail, the injection molded outer layer preform 2P will be taken out at first after opening its mold. Then, this preform will be transported to and placed in another mold so that the inner layer preform 3P is injection molded therein to provide a laminated parison consisting of these preforms 2P and 3P to be blow molded subsequently.

Figure 10:
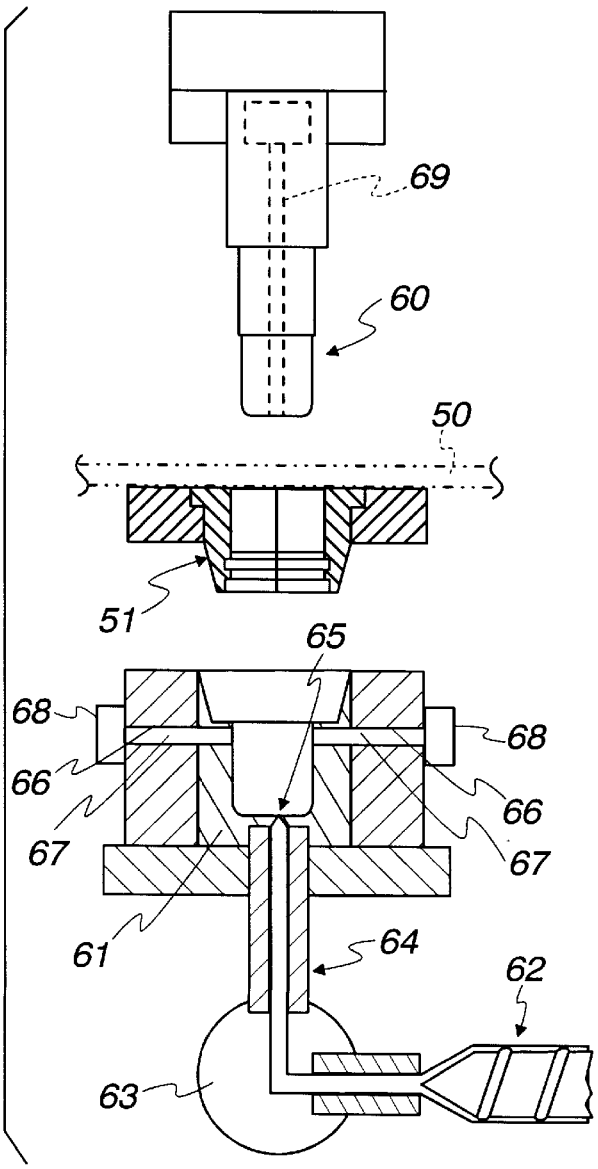
FIG. 10 is a scheme of the step of fastening mold segments together at an injection station (before molding an outer layer preform) in the embodiment of the present invention.
Figure 11:
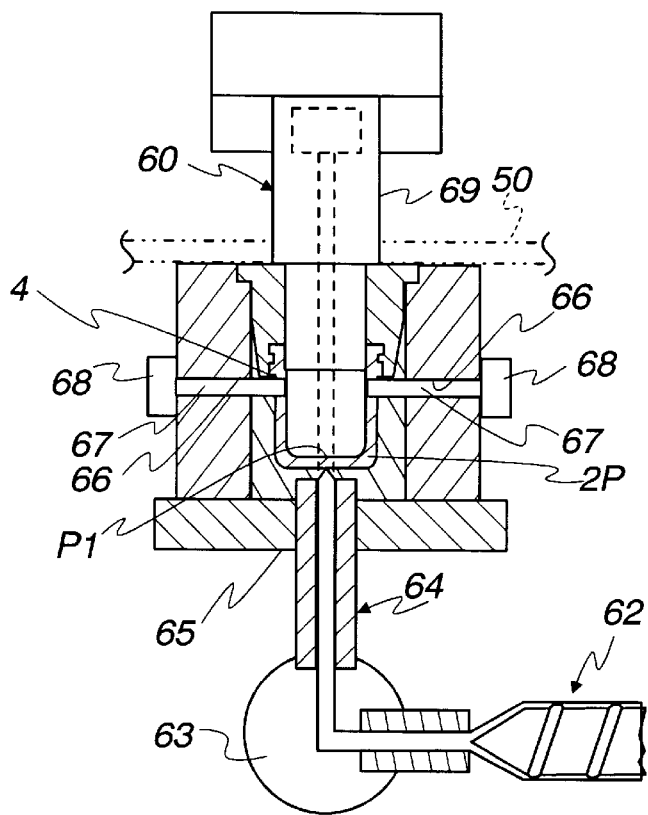
FIG. 11 is a scheme illustrating the injection step conducted at the injection station (to mold the outer layer preform), FIG. 12 also is a scheme illustrating the subsequent injection step carried out at the injection station (to mold an inner layer preform)

FIGS. 10 and 11 show the process of injection molding the outer layer preform 2P at the first substation. In the drawings, an injection core segment 60 (viz., a male mold), the lip segment 51, and a cavity segment 61 (viz., a female mold) are disposed up and down in this order. After fastening these segments to each other in this way, an amount of molten resin will be propelled from an extruder nozzle 62 into the cavity, through a hot runner 63, a nozzle 64 thereof and the gate 65, to thereby produce the outer layer preform 2P.

The cavity segment 61 has two horizontal apertures 66 formed therein to receive pins 67 as the projected members capable of sliding in their axial direction. An inner end portion of each pin 67 protrudes through the cavity segment to contact the core segment 60 when (before or after) feeding a molten resin. This means that these pins 67 do act to pierce through-holes (i.e., the ventilation holes) 4 already at the step of molding the outer layer preform 2P. In the illustrated embodiment, solenoids 68 drives the respective pins 67 towards and away from their projected position. Each of those solenoids 68 will be actuated with an electric current so as to cause the corresponding pin 67 to project towards the cavity until it contacts the core segment 60. By ceasing application of electric current to the solenoids, the pins 67 will be retracted and embedded in the cavity segment. Alternatively, a spring for urging each pin towards its retracted position can be employed, as a matter of course, in combination with a means for supplying a compressed air for driving the pin 13 inwardly. It may also be possible to employ pins each having an arcuate inner end corresponding to curvature of the injection core.

A further pin 69 is provided in connection with the core segment 60 so as to extend longitudinally through a central region thereof. This further pin 69 is slidably held in the core segment 60 so as to be repositioned intermediately between its retracted position wholly embedded in the core segment 60 and its projected position protruding in part therefrom to be pressed on the gate 65. After the cavity is filled with an amount of molten resin, the further pin 69 facing the gate 65 will be forced into the cavity segment so as to seal the gate 65. The preform's central bottom portion that is temporarily occupied by the pin 69 can never be filled with the resin for forming the outer layer preform 2P. This portion will define the through-hole P1 to be produced in the bottom center of the preform 2P. Thus, the through-hole P1 is formed by the further pin 69 already at the step of molding the outer layer preform 2P. Also, this further pin 69 may be driven between its projected and retracted positions by a solenoid, or alternatively by a spring cooperating with a compressed air, or by any other appropriate mechanism.

Figure 12:
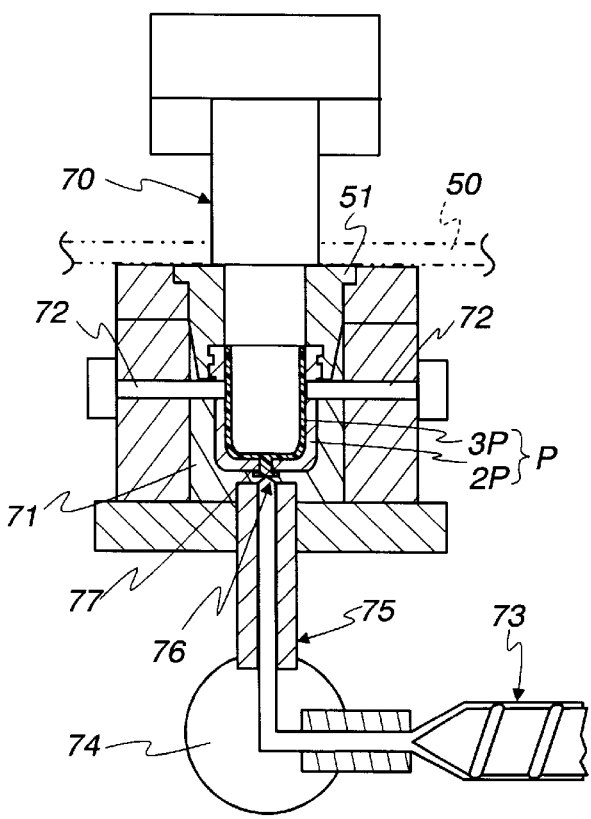

FIG. 12 illustrates how to injection mold the inner layer preform 3P at the second substation. Also in this figure of the drawings, the injection core 70, the lip segment 51 and the cavity segment 71 are arranged up and down in this order. The cavity segment has closing pins 72 formed therein and facing the respective ventilation holes 4 that have been formed in the outer layer preform 2P, wherein those closing pins 72 can be projected and retracted. When projected, the inner ends of the closing pins stand in flush with the inner surface of outer layer preform 2P that has been inserted into the cavity segment 71. When retracted, those pins 72 are embedded in this cavity segment.

The inner layer preform will be molded in such a manner that the outer layer preform 2P is preliminarily placed in the unfastened cavity segment 71 and then the ventilation holes 4 are accurately located to face the closing pins 72. Subsequently, these pins will advance to take their projected position so as to clog the ventilation holes 4. After having fastened the core and cavity segments 70 and 71 together in a vertical direction, an amount of another molten resin will be injected through an extruder nozzle 73. This resin advances through a hot runner 74, a runner nozzle 75 and a gate 76 so as to enter the cavity. In this way, the molten resin dashing in the interior of outer layer preform 2P through the hole P1 formed therein will form the inner layer preform 3P. The core segment 70 for molding the inner layer is slightly smaller in outer diameter than that 60 for molding the outer layer. The difference in diameter determines the wall thickness of the inner layer preform 3P. The cavity segment 71 has a recess 77 facing the through-hole P1 that has been formed in the preform 2P, so that the gate 76 is located in the bottom of recess 77. This gate is positioned below and spaced from the through-hole P1 to be spaced therefrom. Therefore, the flange 31 made of the resin forming the inner layer preform 3P will be disposed outside the through-hole P1 in the outer layer preform 2P. In the example shown in the drawings, the flange 31 protrudes outwards from the through-hole P1, though another fashion of injection molding may alternatively be employed so that the flange has its outer end surface in flush with the outer surface of outer layer preform 2P. The mold for forming the inner layer preform 3P may not necessarily be specially designed as to its gate 76, but any ordinary pin gate (viz., direct gate) may be employed.

The mold having operated to form the inner layer preform 3P will then be opened to have the pins 72 retracted out of the cavity, but allowing the lip segment 51 to continue to hold a parison 'P' consisting of the outer and inner layer preforms 2P and 3P thus laminated on each other.

Figure 13:
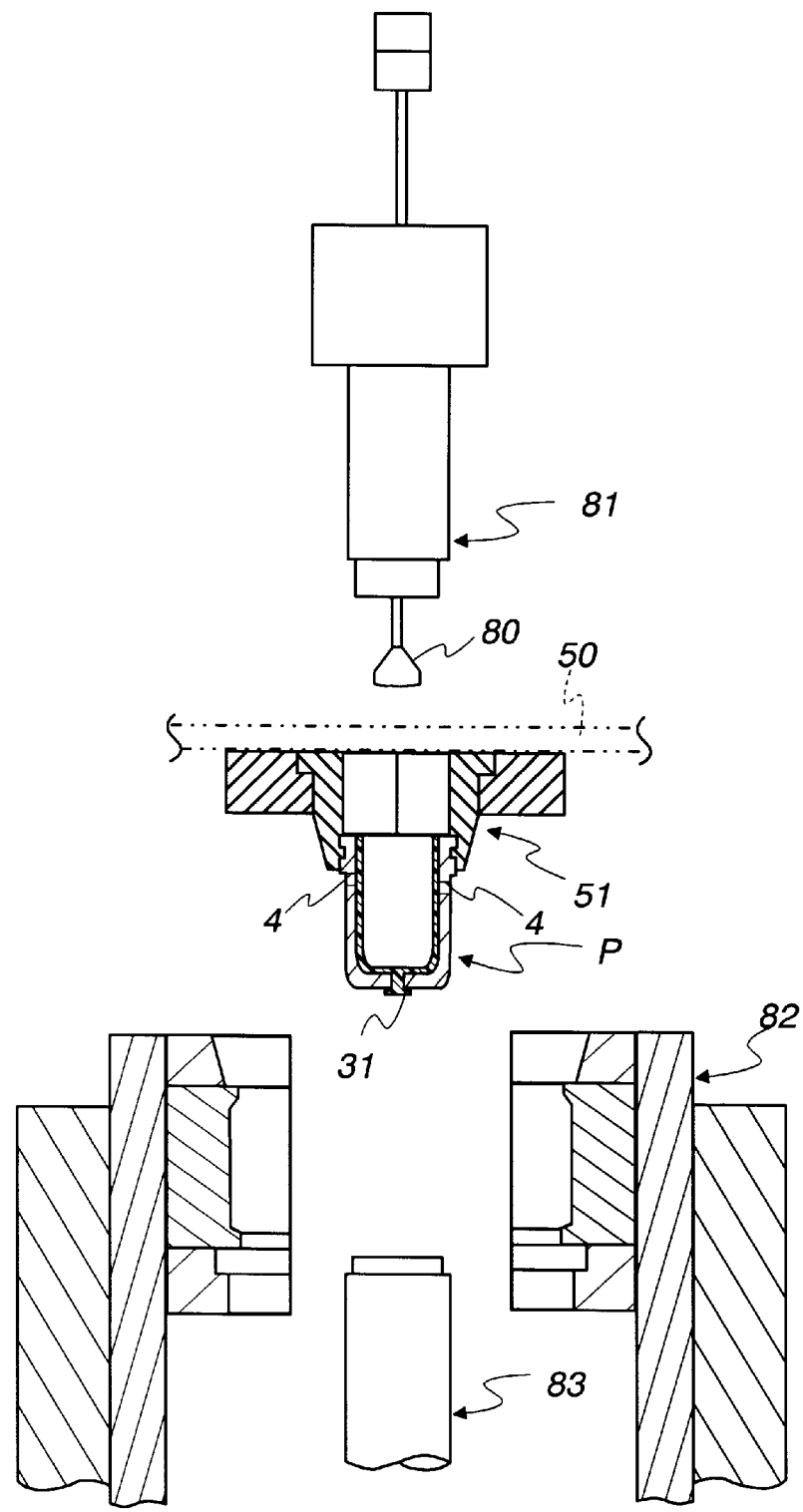
FIG. 13 is a scheme of the transfer step of transferring an integrated preform at a blowing station.
Figure 14:
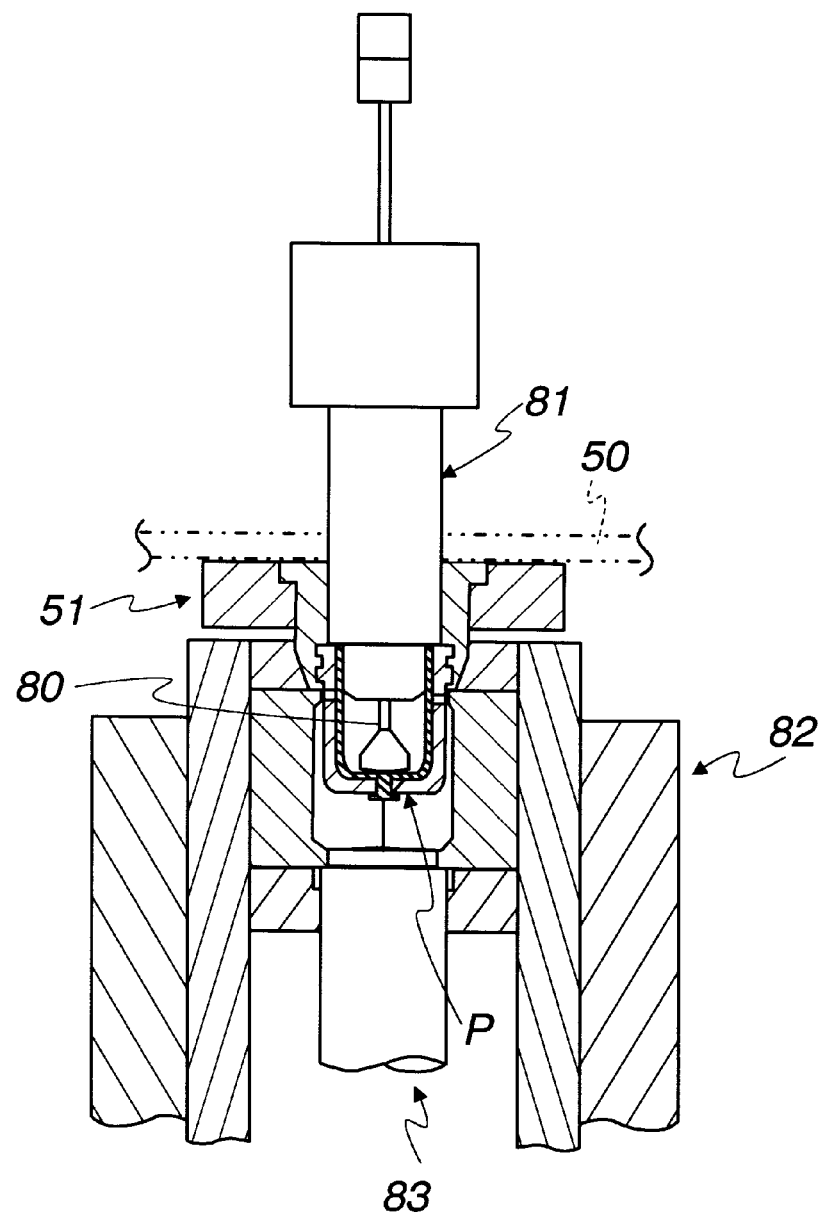
FIG. 14 is likewise a scheme of the step of fastening the mold and stretching the parison, done at the blowing station.
Figure 15:
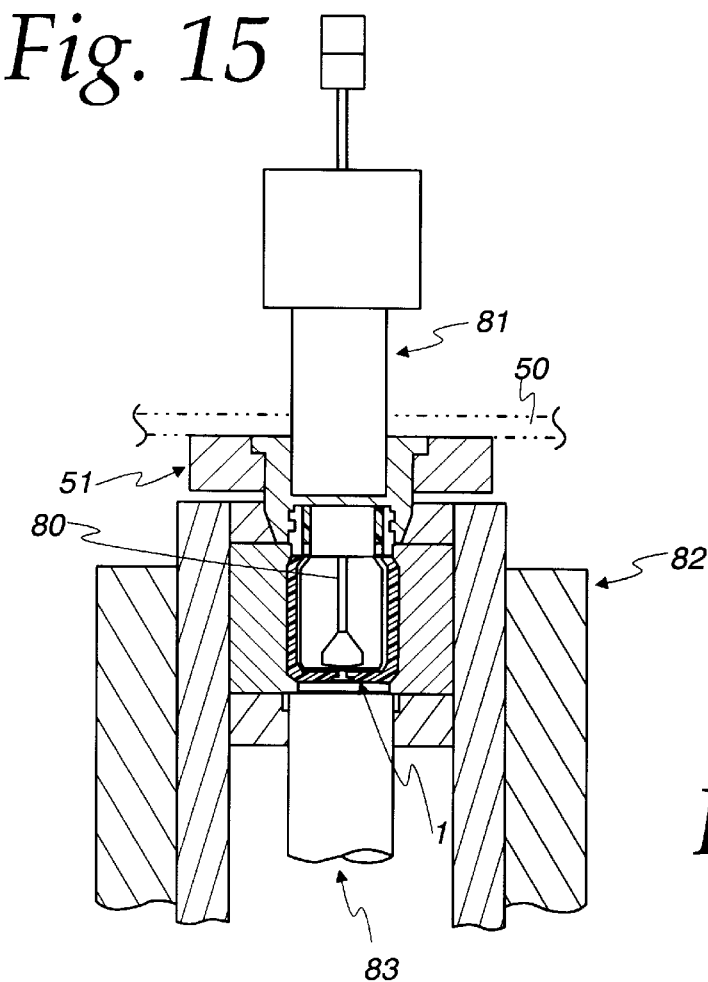
FIG. 15 is a similar scheme of the step of blowing air into and cooling the stretched parison, conducted at the blowing station.

At the blowing station shown in FIGS. 13 to 15, there are provided a blow core segment 81 having a stretching rod 80 attached thereto, the lip segment 51 holding the parison 'P', a blow cavity segment 82, and a bottom segment 83. These segments are, also at this station, arranged up and down. After having fixed these segments together and placed the parison 'P' in the blow cavity segment 82, this parison will be heated to a given temperature. Thereafter, the stretching rod 80 is driven downwards to have its end 81 positioned in the parison 'P'. This rod will push down the parison bottom to effect the so-called 'longitudinal stretching' process. Subsequent to this process, a compressed air will be introduced through the blow core 81 into the parison, to thereby expand same to undergo the 'transversely stretching' process. However during these processes, the parison's minor portion where the ventilation holes 4 have been formed (near the lower end of the container's mouth part) are firmly held in position by the lip segment within the blow cavity segment 82. Thus, the stretching for orientation is only effected in the parison's major region located below said minor portion, but not effected therein around the ventilation holes 4. After having been stretched, the parison will be cooled down to give a finished laminated bottle 1.

Figure 16:
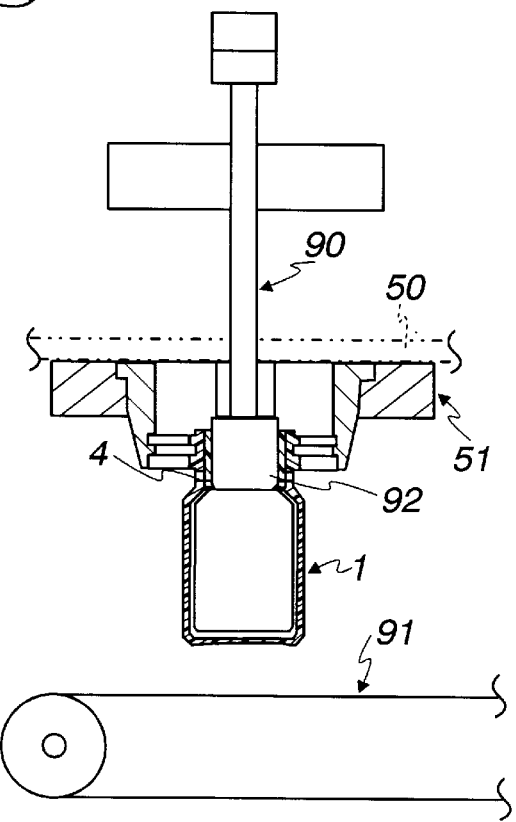
FIG. 16 is a scheme of the step of ejecting a finished molded product at an ejection station so as to take it out.

At the discharging station for taking out molded products as shown in FIG. 16, an ejector rod 90, the lip segment 51 for holding the laminated bottle 1, and a transporting apparatus 91 like a conveyor belt are arranged also vertically in this order. The ejector rod 90 has an ejecting foot 92 at its inner end. This foot 92 will fit in the mouth part 1b of bottle, before opening the lip segment 51 in a horizontal direction to put the bottle 1 down on the conveyor 91.

As discussed above in detail, the ventilation holes 4 will have already been formed at the step of molding the outer layer preform 2P so that the inner layer will never be injured as in the prior art when forming said holes. Further, works for manually piercing such holes one by one in the injection molded outer layer 2P after completing the laminated bottle 1 are no longer necessary, thus enhancing manufacture efficiency. After molding the delaminating inner layer preform 3P on the inner surface of outer layer preform, the stretching for orientation of the preforms is carried out only for a region thereof located below the ventilation holes 4. By virtue of this feature, the inner layer's region where the ventilation holes in the outer layer are present will keep its original or 'non-stretched' thickness. Such a relatively thicker region will satisfactorily function as 'valve bodies' cooperating with ventilation holes 4, so that manufacture process is now rendered more simple and less expensive than in the case of preparing and attaching discrete valves. In addition, the inner end of the pin 72 is positioned herein to be generally in flush with the inner surface of outer layer preform 2P during the molding of inner layer preform 3P. Accordingly, the resin forming this preform will be prevented from filling vacant spaces that have been previously formed in the outer layer preform 2P so as to serve later as the ventilation holes 4 in a finished product.

The pins disposed in the cavity segment in the embodiment described above may be replaced with another pair of pins that are disposed in the lip segment to contact the sides of injection core. Alternatively, the injection core may be equipped with substituting pins in such a way as to contact the inner surface of the lip segment. Since the lip segment consists of split into halves separable in a transverse direction, appropriate rod or like protrusion may be fixed in place in parallel with this direction, allowing it to contact the core segment as the lip segment is driven to take its fastened position. The present invention exemplified in the embodiments is applied to the laminated container that comprised the single outer layer and the single inner layer. However, the invention can also apply to any other type container whose outer and/or inner layers are composed each of two or more layers or strata.

In the described embodiments, the ventilation holes 4 are formed in the mouth part of the container. However, they may alternatively be formed in any portion of the container if its inner layer is designed to function as a valve body. For example, the ventilation holes 4 may be formed in the bottom of the bottle.

What is claimed is:

1. A laminated bottle comprising:
    an outer layer and an inner layer laminated on an inner surface of the outer layer,
    wherein the inner layer is capable of delaminating from the outer layer, a ventilation hole is formed in the outer layer to allow ambient air to flow into a space between the outer layer and the inner layer, the ventilation hole is normally closed from inside with a portion of the inner layer blocking said ventilation hole, the closing portion of the inner layer functions as a valve that is capable of inward deforming due to atmospheric pressure in response to a negative pressure appearing in the space and returning to blocking said ventilation hole after said negative pressure appears in the space, and the ventilation hole opens as a result of the deforming of the valve.

2. A laminated bottle as defined in claim 1, wherein the closing portion of the inner layer has elasticity for recovery so as to close the ventilation hole.

3. A laminated bottle as defined in claim 1, wherein each of the outer layer and the inner layer substantially comprises of a body part and a mouth part.

4. A laminated bottle, comprising:

an outer layer and an inner layer laminated on an inner surface of the outer layer, wherein each of the outer layer and the inner layer substantially comprises of a body part and a mouth part;

wherein the inner layer is capable of delaminating from the outer layer, a ventilation hole is formed in the mouth part of the outer layer to allow ambient air to flow into a space between the outer layer and the inner layer, the ventilation hole is normally closed from inside with a portion of the inner layer, the closing portion of the inner layer functions as a valve that is capable of inward deforming due to atmospheric pressure in response to a negative pressure appearing in the space, the ventilation hole opens as a result of the deforming of the valve, the mouth part of the inner layer acts as the portion for closing the ventilation hole, and the mouth part of the inner layer is thicker than the body part of the inner layer.

5. A laminated bottle as defined in claim 4, wherein the body part of the inner layer is thinner than the mouth part of the inner layer to be of a film-like shape, and a portion of the mouth part of the inner layer, which is located adjacent to the ventilation hole, is thicker than the body part of the inner layer so as to be capable of elastic recovery.

6. A laminated bottle, comprising:

an outer layer and an inner layer laminated on an inner surface of the outer layer, wherein each of the outer layer and the inner layer substantially comprises of a body part and a mouth part and each of the mouth parts of the outer layer and the inner layer is of a cylindrical shape;

wherein the inner layer is capable of delaminating from the outer layer, a ventilation hole is formed in the mouth part of the outer layer to allow ambient air to flow into a space between the outer layer and the inner layer, the ventilation hole is normally closed from inside with a portion of the inner layer, the closing portion of the inner layer functions as a valve that is capable of inward deforming due to atmospheric pressure in response to a negative pressure appearing in the space, the ventilation hole opens as a result of the deforming of the valve, and the mouth part of the inner layer acts as the portion for closing the ventilation hole.

7. A laminated bottle as defined in claim 6, wherein the body part of the inner layer is thinner than the mouth part of the inner layer to be of a film-like shape, and a portion of the mouth part of the inner layer, which is located adjacent to the ventilation hole, is thicker than the body part of the inner layer so as to be capable of elastic recovery.

8. A laminated bottle as defined in claim 1, wherein the bottle is formed by the injection-stretch-blow-molding method, each of the inner layer and the outer layer has a bottom, the bottom of the inner layer has a flange fixed on the bottom of the outer layer, the flange is formed when molding a inner preform for forming the inner layer by injecting a molten resin to an interior of an outer preform for forming the outer layer through a through-hole that is previously formed in a bottom of the outer preform.

9. A pumping container comprising:

a laminated bottle comprising of an outer layer and an inner layer laminated on an inner surface of the outer layer; and a cap fitted on the mouth part of the laminated bottle, wherein the inner layer is capable of delaminating from the outer layer;

a ventilation hole is formed in the outer layer to allow ambient air to flow into a space between the outer layer and the inner layer;

the ventilation hole is normally closed from inside with a closing portion of the inner layer;

the closing portion of the inner layer blocking said ventilation hole to function as a valve that is capable of inward deforming due to atmospheric pressure in response to a negative pressure appearing in the space and returning to blocking said ventilation hole after said negative pressure appears in the space, the ventilation hole opens as a result of the deforming of the valve;

each of the outer layer and the inner layer is substantially comprising of a body part and a mouth part;

the body part of the outer layer is capable of being deformed so as to deflate;

the cap has an outlet orifice for discharging a content stored within the inner layer of the laminated bottle, and a check valve is attached to the outlet orifice.

10. A pumping container as defined in claim 9, wherein the closing portion of the inner layer has elasticity for recovery so as to close the ventilation hole.

11. A pumping container comprising:

a laminated bottle comprising of an outer layer and an inner layer laminated on an inner surface of the outer layer, each of the outer layer and the inner layer being substantially comprised of a body part and a mouth part; and a cap fitted on the mouth part of the laminated bottle, wherein the inner layer is capable of delaminating from the outer layer;

a ventilation hole of the laminated bottle formed in the mouth part of the outer layer to allow ambient air to flow into a space between the outer layer and the inner layer;

the ventilation hole is normally closed from inside with a closing portion of the inner layer, the mouth part of the inner layer acts as the portion for closing the ventilation hole, and the mouth part of the inner layer is thicker than the body part of the inner layer;

the closing portion of the inner layer functions as a valve that is capable of inward deforming due to atmospheric pressure in response to a negative pressure appearing in the space, the ventilation hole opens as a result of the deforming of the valve;

the body part of the outer layer is capable of being deformed so as to deflate;

the cap has an outlet orifice for discharging a content stored within the inner layer of the laminated bottle, and a check valve is attached to the outlet orifice.

12. A pumping container as defined in claim 11, wherein the body part of the inner layer is thinner than the mouth part of the inner layer to be of a film-like shape, and a portion of the mouth part of the inner layer, which is located adjacent to the ventilation hole, is thicker than the body part of the inner layer so as to be capable of elastic recovery.

13. A pumping container comprising:

a laminated bottle comprising of an outer layer and an inner layer laminated on an inner surface of the outer layer; and a cap fitted on the mouth part of the laminated bottle, wherein the inner layer is capable of delaminating from the outer layer;

a ventilation hole is formed in the outer layer to allow ambient air to flow into a space between the outer layer and the inner layer;

the ventilation hole is normally closed from inside with a closing portion of the inner layer;

the closing portion of the inner layer functions as a valve that is capable of inward deforming due to atmospheric pressure in response to a negative pressure appearing in the space, the ventilation hole opens as a result of the deforming of the valve;

each of the outer layer and the inner layer is substantially comprising of a body part and a mouth part;

the body part of the outer layer is capable of being deformed so as to deflate;

the cap has an outlet orifice for discharging a content stored within the inner layer of the laminated bottle, and a check valve is attached to the outlet orifice;

each of the mouth parts of the outer and inner layers is of a cylindrical shape, the ventilation hole is formed in the mouth part of the outer layer, and the mouth part of the inner layer acts as the portion for closing the ventilation hole.

14. A pumping container as defined in claim 13, wherein the body part of the inner layer is thinner than the mouth part of the inner layer to be of a film-like shape, and a portion of the mouth part of the inner layer, which is located adjacent to the ventilation hole, is thicker than the body part of the inner layer so as to be capable of elastic recovery.

15. A pumping container as defined in claim 9, wherein the closing portion of the inner layer is capable of being pressed outwards by the content being discharged so as to close the ventilation hole of the outer layer by the pressed portion.

16. A pumping container as defined in claim 9, wherein each of the inner layer and the outer layer of the laminated bottle has a bottom, and the bottoms of the inner layer and the outer layer are fixed to each other so as to prevent a lower end portion of the inner layer from curling up.

* * * * *